United States Patent
Ross et al.

(10) Patent No.: US 9,564,747 B2
(45) Date of Patent: Feb. 7, 2017

(54) SYSTEM AND METHOD FOR PROVIDING DISCRETE ACCESS POINTS IN AN ELECTRICAL BUSWAY

(71) Applicant: UNIVERSAL ELECTRIC CORPORATION, Canonsburg, PA (US)

(72) Inventors: Steven L. Ross, Pittsburgh, PA (US); Thomas J. Davidson, Jr., Greensburg, PA (US)

(73) Assignee: UNIVERSAL ELECTRIC CORPORATION, Canonsburg, PA (US)

( * ) Notice: Subject to any disclaimer, the term of this patent is extended or adjusted under 35 U.S.C. 154(b) by 130 days.

(21) Appl. No.: 14/193,236

(22) Filed: Feb. 28, 2014

(65) Prior Publication Data

US 2014/0246229 A1    Sep. 4, 2014

Related U.S. Application Data

(60) Provisional application No. 61/771,382, filed on Mar. 1, 2013.

(51) Int. Cl.
| | |
|---|---|
| H02G 5/06 | (2006.01) |
| H01R 25/14 | (2006.01) |
| H01R 13/447 | (2006.01) |

(52) U.S. Cl.
CPC .............. *H02G 5/06* (2013.01); *H01R 13/447* (2013.01); *H01R 25/14* (2013.01)

(58) Field of Classification Search
USPC ........................ 174/70 B; 439/251
See application file for complete search history.

(56) References Cited

U.S. PATENT DOCUMENTS

| | | | | | |
|---|---|---|---|---|---|
| 2,306,353 | A | * | 12/1942 | Cole ................... | H02G 5/06 174/101 |
| 3,042,889 | A | * | 7/1962 | Johnston ............. | H02G 5/06 174/88 B |
| 3,831,130 | A | * | 8/1974 | Valtonen .............. | H01R 25/14 439/115 |
| 6,039,584 | A | * | 3/2000 | Ross .................... | H01R 25/14 439/115 |

(Continued)

FOREIGN PATENT DOCUMENTS

| | | |
|---|---|---|
| EP | 1 717 911 A2 | 11/2006 |
| GB | 2 067 363 A | 7/1981 |
| GB | 2 377 093 A | 12/2002 |

OTHER PUBLICATIONS

USPTO ISA/US, "International Search Report and Written Opinion", Jun. 11, 2014, 11 pp.

(Continued)

*Primary Examiner* — William H Mayo, III
*Assistant Examiner* — Krystal Robinson
(74) *Attorney, Agent, or Firm* — Eckert Seamans; Stephen Bucchianeri (57) ABSTRACT

A member for separating the access slot in the housing of a continuous electrical busway into a number of discrete openings includes a body portion formed from a non-conductive material. The body portion includes a portion structured to span across the access slot and thus divide the slot into more than one discrete opening while only blocking a small portion of the access slot.

12 Claims, 7 Drawing Sheets

(56) References Cited

U.S. PATENT DOCUMENTS

| | | | |
|---|---|---|---|
| 6,560,123 B1* | 5/2003 | de Varennes | H01H 73/08 174/208 |
| 6,664,478 B2 | 12/2003 | Mohan et al. | |
| 6,739,740 B1 | 5/2004 | Feldman | |
| 2002/0080562 A1* | 6/2002 | Nakamura | H01H 9/10 361/626 |
| 2003/0224636 A1 | 12/2003 | Lorenzen et al. | |
| 2008/0302566 A1* | 12/2008 | Ross | H02G 3/0418 174/70 B |
| 2009/0047814 A1* | 2/2009 | Daamen | H01R 13/6315 439/251 |
| 2011/0261508 A1* | 10/2011 | Ross | H01R 25/14 361/624 |

OTHER PUBLICATIONS

European Patent Office, "partial supplementary European search report", EP 14 75 6308.4, Aug. 19, 2016, 7 pp.

\* cited by examiner

SYSTEM AND METHOD FOR PROVIDING DISCRETE ACCESS POINTS IN AN ELECTRICAL BUSWAY

CLAIM TO PRIORITY

This patent application claims the priority benefit under 35 U.S.C. §119(e) of U.S. Provisional Application No. 61/771,382 filed on Mar. 1, 2013, and entitled, "System and Method for Providing Discrete Access Points in an Electrical Busway," the contents of which are hereby incorporated herein by reference.

FIELD OF THE INVENTION

The present invention generally relates to electrical busways, and more particularly, to systems for converting the access slot of an otherwise continuous plug-in busway into discrete access points. The present invention also relates to methods for converting the access slot of an otherwise continuous plug-in busway into discrete access points

DESCRIPTION OF THE RELATED ART

It is common in factories, shops, offices and other buildings to install overhead electrical power distribution tracks for providing a convenient source of electricity for lights, machines and other electrical devices in the buildings. Electrical power distribution tracks are typically comprised of an elongated housing containing multiple electrically-isolated, conductive busbars. Track lighting and continuous plug-in busway are typical examples of this type of track system. Sections of the track can be joined together to form long runs for power distribution. Take-off devices are used to tap power from the track or busway to the load apparatus. The load may be anything from a lamp to a three phase electrical machine. It is desirable to be able to insert take-off devices into, or remove them from, the track at any point along the track itself and make a secure electrical contact with the busbars. Such systems are generally defined as "continuous plug-in busway". It is also desirable that the electrical connection between take-off devices and the busbar not require bolts, crimps or other fastening hardware. A pressure connection is easily made or removed and is therefore the method of choice for most busbars to take-off device connections.

Figure 1:
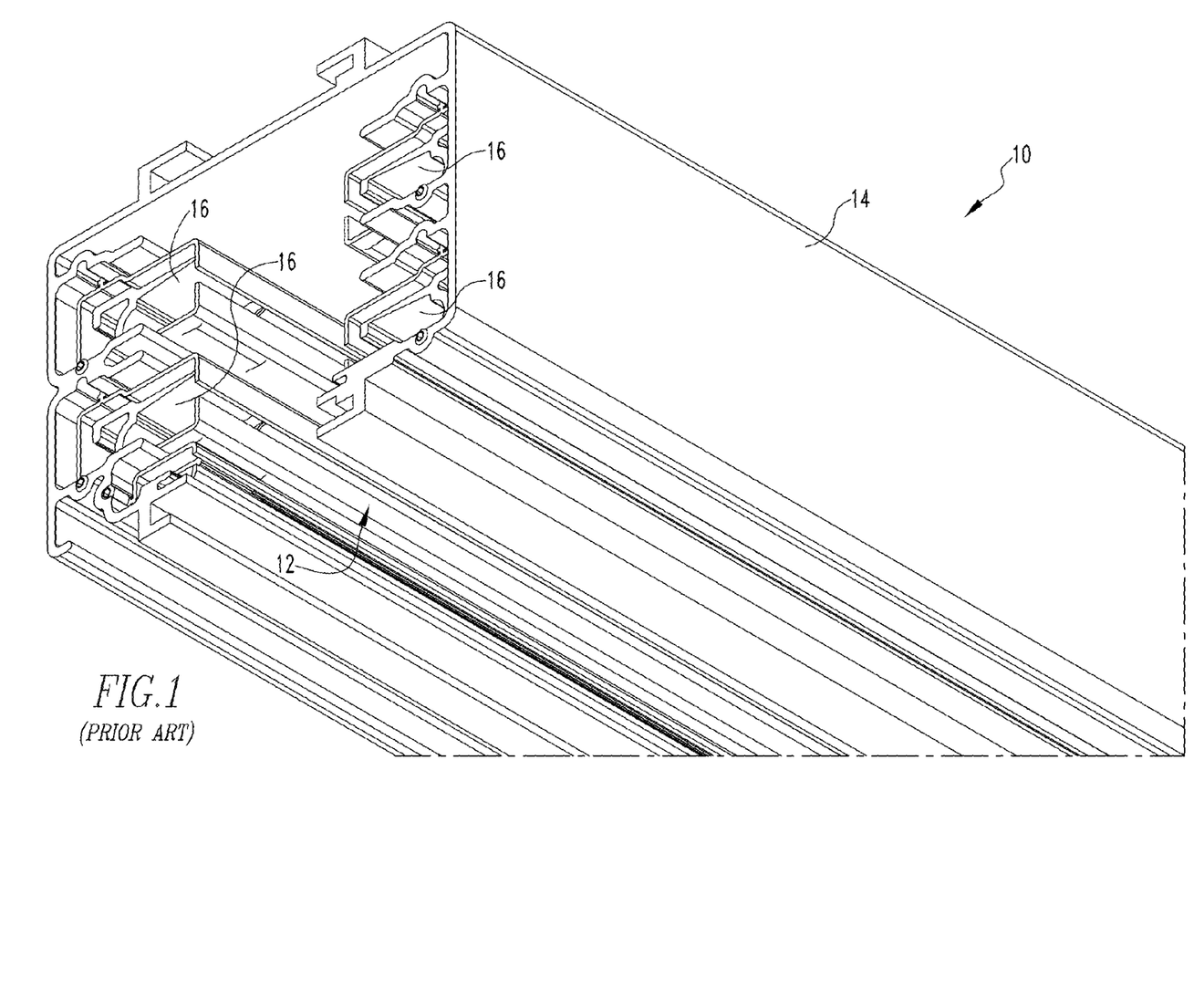
FIG. 1 is an isometric view of the end of a section of continuous busway as known in the art.

FIG. 1 illustrates a portion of an example of a section of continuous busway 10 as known in the art. By being "continuous", thus allowing for a take-off device (not shown) to be placed anywhere along the length thereof, such busway provides ultimate flexibility, but for applications above 225 or 400 amps (depending on in the US or Canada and Mexico), does not meet the applicable UL Standard.

Other examples of known busway systems, such as those discussed in the application from which this application claims priority, have specific openings for plug-in units. Such opening are usually provided on 2 foot center spacings. Such designs do not provide a comparable degree of flexibility for locating a take-off device as continuous busway systems.

Yet further examples of known busway systems utilize shutter assembly closures provided at predetermined access points. While such approach satisfies the safety standard, it does not provide a comparable degree of flexibility of locating a take-off device as continuous busway systems. Also, the operation such shutter assembly closures is generally not convenient.

Accordingly, a need exists for an improved busway that meets all applicable standards without overly limiting access for take-off devices.

SUMMARY

These needs and others are met by embodiments of the present invention which, as a first aspect, provide a member for separating the access slot in the housing of a continuous electrical busway into a number of discrete openings. The member comprises a body portion formed from a non-conductive material, the body portion including a portion structured to span across the access slot and thus divide the slot into more than one discrete opening while only blocking a small portion of the access slot.

The portion of the member may be structured to cover at most 20% of the area of the access slot which is divided into discrete openings.

The portion of the member may be structured to cover about 10% of the area of the access slot which is divided into discrete openings.

The member may further comprise a securement mechanism structured to couple the member to the housing.

As another aspect of the present invention an electrical busway assembly is provided. The electrical busway assembly comprises: a housing; a number of busbars disposed in the housing; a continuous access slot defined by, and running along generally the entire length of the housing; and a plurality of members as previously discussed disposed in the access slot such that the access slot is divided into a plurality of discrete openings.

The portions of the plurality of members may cover at most 20% of the area of the access slot.

The portions of the plurality of members may cover about 10% of the area of the access slot.

Each member of the plurality of members may be coupled to the housing via a securement mechanism.

As yet another aspect of the invention, an electrical busway comprises: a housing; a continuous access slot defined by, and running along generally the entire length of the housing; at least two busbars disposed in a generally opposed manner within the housing along the access slot; a pair of non-conductive shield members disposed generally parallel to each other within the housing such that each shield member generally abuts an opening provided in each of the busbars, each shield member comprising a plurality of discrete slots formed therein and disposed linearly along each of shield members, each slot positioned and structured to allow access to a respective one of the busbars; and a plurality of members as recited previously described disposed in the access slot between and abutting each of the shield members such that the access slot is divided into a plurality of discrete openings.

Each member of the plurality of members may be coupled to the housing via a securement mechanism.

As a further aspect of the invention, a method for converting a section of electrical busway having a continuous access slot provided in a housing thereof into an electrical busway having a number of discrete access points is provided. The method comprises: disposing a plurality of non-conductive separating members in the continuous access slot of the electrical busway such that each of the members span across a section of the slot thus dividing the slot into a plurality of discrete access openings bounded by adjacent members.

The plurality of separating members may be disposed such that only a minimal amount of the access slot is blocked.

The separating members may be disposed in the electrical busway during initial assembly of the busway.

The separating members may be disposed in the electrical busway as a retro-fit operation after the busway has been assembled.

The method may further comprise securing each of the non-conductive separating members to a portion of the electrical busway.

As yet another aspect of the invention, an insulator member for generally isolating a busbar along the length thereof comprises an elongate body portion formed form a non-conductive material adapted to completely surround the perimeter of the busbar aside from where an opening is provided therein. The opening is positioned and structured to allow a stab member of a takeoff device to pass therethrough and engage the busbar. The body includes a number of structures disposed adjacent the opening to define a predetermined minimum depth from the outer most portion of the opening to the nearest conductive portion of the busbar.

The number of structures may comprise lip members disposed on opposing sides of the opening and extending outward from the body portion.

The opening may comprises a plurality of discrete openings formed in the body portion.

As another aspect of the present invention, an insulator member for generally isolating a busbar along the length thereof comprises an elongate body portion formed form a non-conductive material adapted to completely surround the perimeter of the busbar aside from where a plurality of discrete openings are provided therein. Each of the discrete openings is positioned and structured to allow a stab member of a takeoff device to pass therethrough and engage the busbar.

As yet a further aspect of the invention, an electrical busway comprises: a housing; a continuous access slot defined by, and running along generally the entire length of the housing; at least two busbars disposed in a generally opposed manner within the housing along the access slot, each of the busbars being disposed in an insulator member as previously described; and a plurality of dividing members disposed in the access slot such that the access slot is divided into a plurality of discrete openings. Each of the dividing members comprises a body portion formed from a non-conductive material. The body portion includes a portion structured to span across the access slot and thus divide the slot into more than one discrete opening while only blocking a small portion of the access slot.

DETAILED DESCRIPTION OF EXEMPLARY EMBODIMENTS

Directional phrases used herein, such as, for example, left, right, clockwise, counterclockwise, top, bottom, up, down, and derivatives thereof, relate to the orientation of the elements shown in the drawings and are not limiting upon the claims unless expressly recited therein.

As employed herein, the term "number" shall mean one or an integer greater than one (i.e., a plurality) and the singular form of "a", "an", and "the" include plural referents unless the context clearly indicates otherwise.

Although not particularly discussed for each element of present invention, it is to be appreciated that the elements discussed below for generally converting a continuous electrical busway into a conventional electrical busway having a plurality of discrete openings may each be formed from any suitable non-conductive (i.e., insulating) material or materials such as, for example, without limitation plastics such as polycarbonate, PVC, PPX (polyphenoloxide), etc. It is also to be appreciated that each element may be formed from any suitable fabrication process such as, for example, without limitation, injection molding, or extrusion. Furthermore, it is also to be appreciated that one or more characteristics of the elements may be varied without varying from the scope of the present invention. Such characteristics may include, for example, without limitation, one or more of the length, width, quantity, location, spacing and cross-sectional structure (e.g., the dividers described below may be formed as a solid instead of the generally honeycombed structures depicted herein). Also, although described herein as being installed at the time of manufacture, other example embodiments may be installed after manufacture (i.e., retrofitted) into existing busways and may be fixed in position via one or more mechanical fasteners or adhesives or may be generally secured via a generally adjustable, frictional fit.

A typical continuous plug-in busway 10, such as shown in FIG. 1, is designed to allow installation of take-off devices at any point along the track. Busway 10 includes an elongated housing 14 (typically formed from a rigid material, e.g., without limitation, extruded aluminum) having a number of internally mounted insulated busbars 16 housed therein. By the definition of the UL (Underwriter's Laboratories) Standard 857 for Plug-In Busways, a continuous plug-in busway has an upper limit rating of 225 amps (United States) and 400 amps (Canada & Mexico). The primary distinction between continuous plug-in busway and "conventional" busway systems is the "opening" or "access point" 12 where take-off devices may be installed. For busway systems rated in excess of 225 or 400 amps, discrete, non-continuous "openings" must be provided in accordance with UL857 paragraph 7.2.5. Embodiments of the present invention create non-continuous access points in what would otherwise be a continuous plug-in busway, thus allowing for the use of such busways in applications above 225 amps (United States) and 400 amps (Canada and Mexico).

Figure 2:
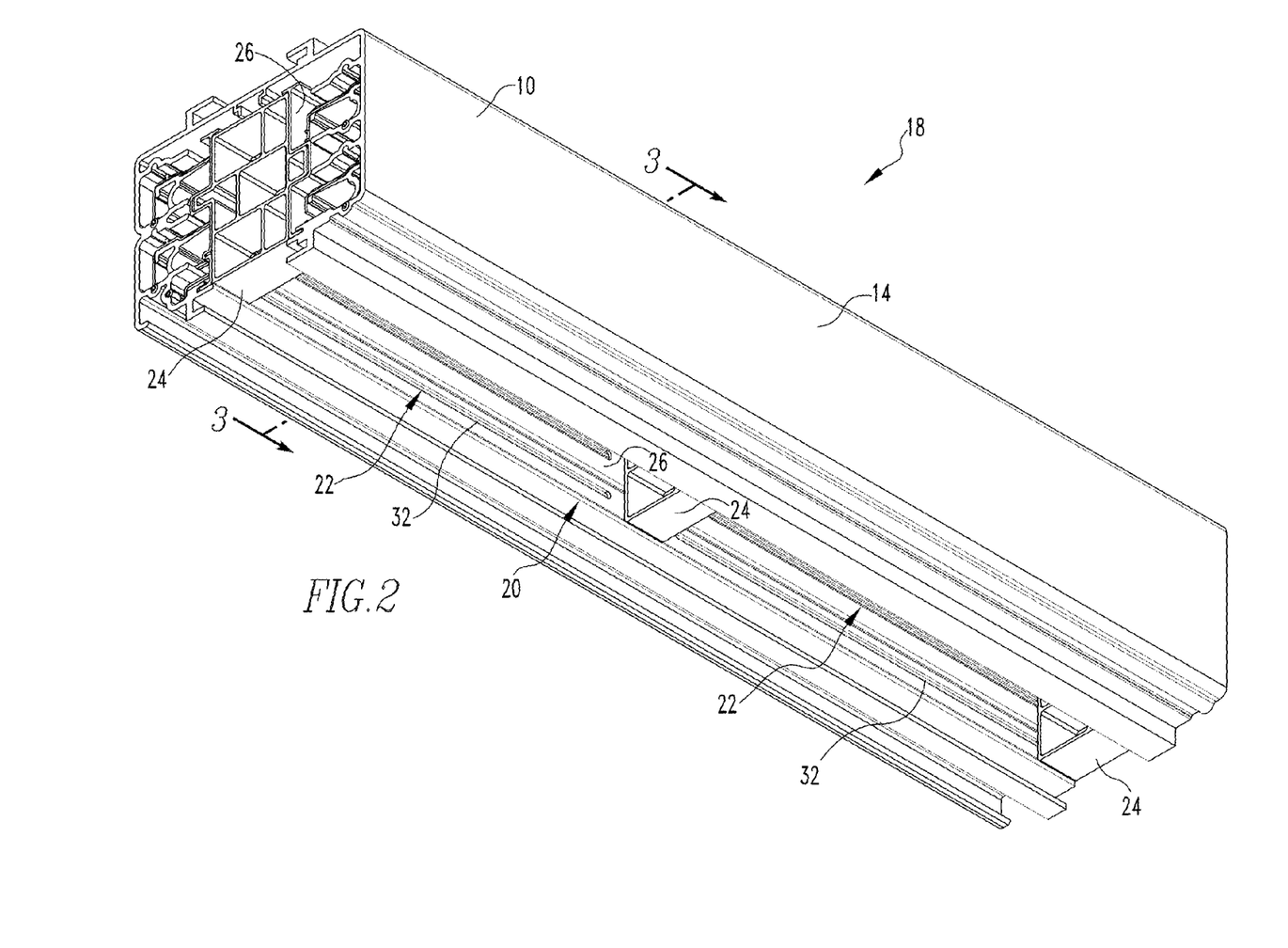
FIG. 2 is an isometric view of a section of a conventional, "non-continuous" busway assembly in accordance with an example embodiment of the present invention.
Figure 3:
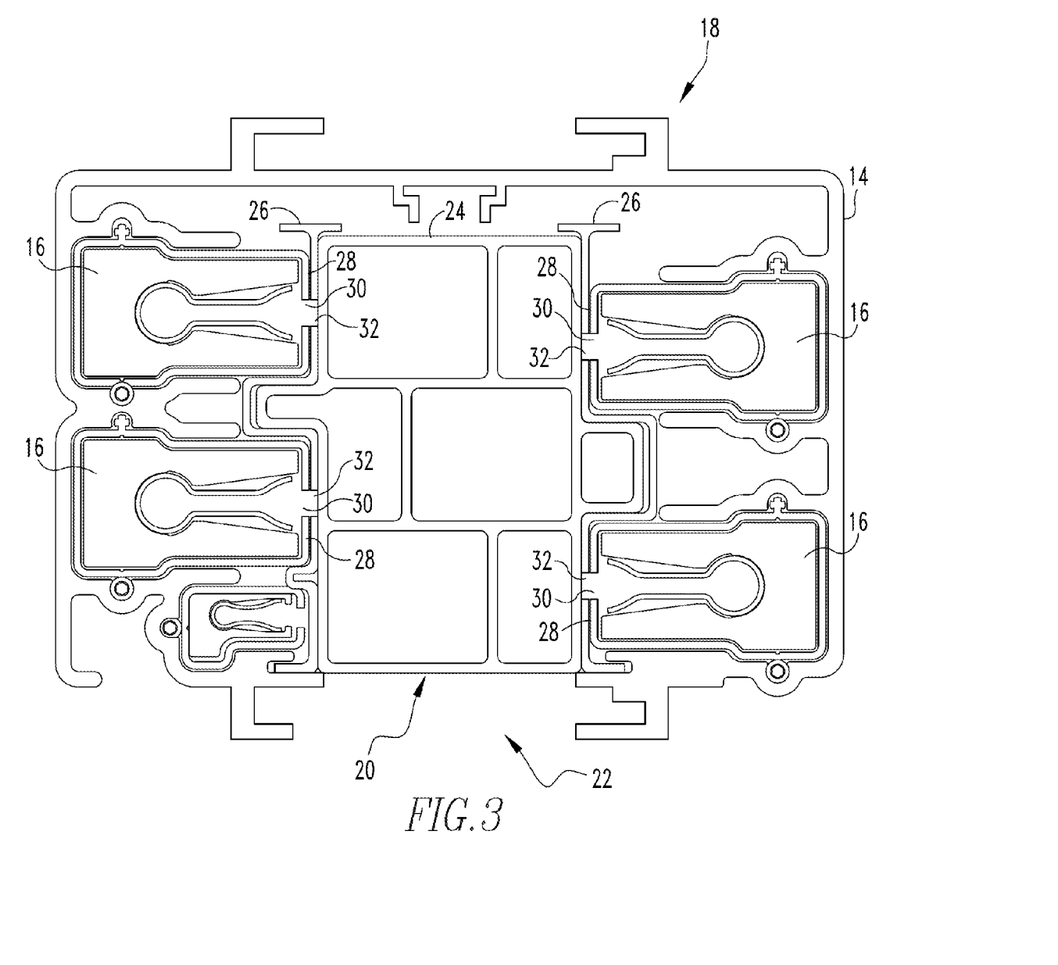
FIG. 3 is a sectional view of the busway assembly of FIG. 2 taken along line 3-3 of FIG. 2.
Figure 4:
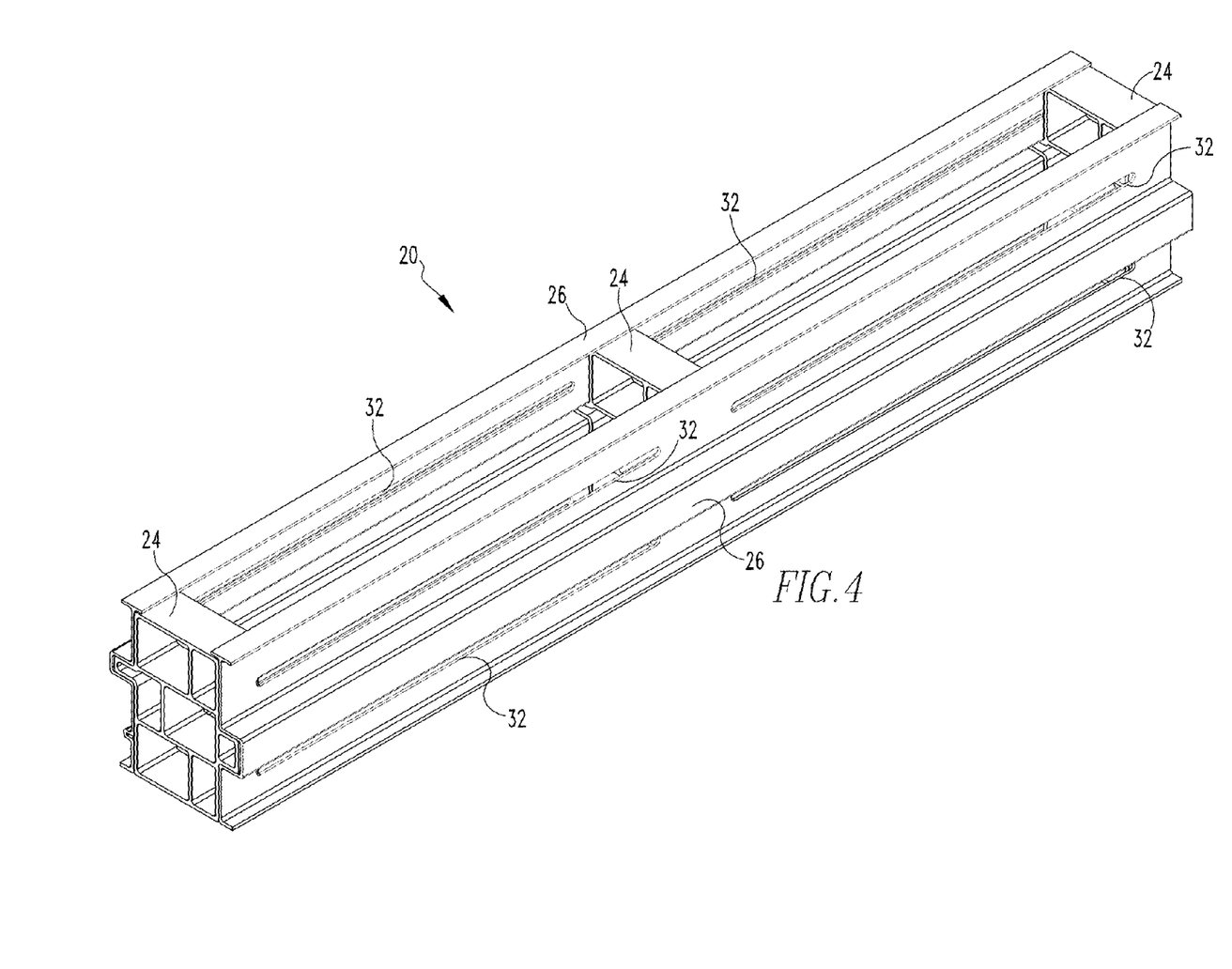
FIG. 4 is an isometric view of insulator assembly of the busway assembly of FIGS. 2 and 3.

FIGS. 2 and 3 illustrate an example embodiment of a busway assembly 18 in accordance with the present invention. Busway assembly 18 includes a section of busway 10, such as shown in FIG. 1, and an insulator assembly 20, such as shown in FIG. 4 which converts the continuous busway of FIG. 1 into a conventional busway having a number of distinct "openings" 22 (two are shown in FIG. 2) of any reasonable and convenient length formed by a number of non-conductive transverse members 24 disposed in what was previously the continuous opening 12 shown in FIG. 1. More particularly, Each discrete opening 22 is formed in the previously continuous opening 12 by transverse members 24 disposed at either end thereof which span across the opening 12 (FIG. 1) and which form a part of insulator assembly 20.

Referring to FIGS. 3 and 4, insulator assembly 20 further includes a pair of shield members 26 disposed generally parallel to each other along both sides (not numbered) of the interior of busway assembly 18 such that each shield member 26 generally abuts the face 28 and/or continuous opening 30 (FIG. 3) of busbars 16. Each shield member 26 is generally secured in such position via the number of transverse members 24 and includes a number of discrete apertures or slots 32 (FIGS. 2 and 4) formed therein and disposed linearly along each of shield members 26. As shown in the sectional view of FIG. 3, each slot 32 is positioned to allow access to the continuous opening 30 of each busbar 16 when insulator assembly 20 is disposed within busway section 10 forming busway assembly 18. Such arrangement provides for the continuous opening 30 of each busbar to be divided into discrete openings corresponding to the dimensions of each slot 32. In addition to dividing the continuous openings 30 of the busbars 16 into discrete openings, each shield member 26 provides a specific thickness that ensures that any exposed electrically conductive parts of the busbars 16 are recessed behind the slots 32 by the UL required distance.

Preferably, each insulator assembly 20 is inserted into each busway section 10 at the time of manufacture and is a generally permanent and fixed portion of the busway assembly 18. Multiple insulator assemblies 20 may be coupled together (e.g., without limitation, via glue) to match the desired length of the manufactured busway section 10.

Figures 5, 6:
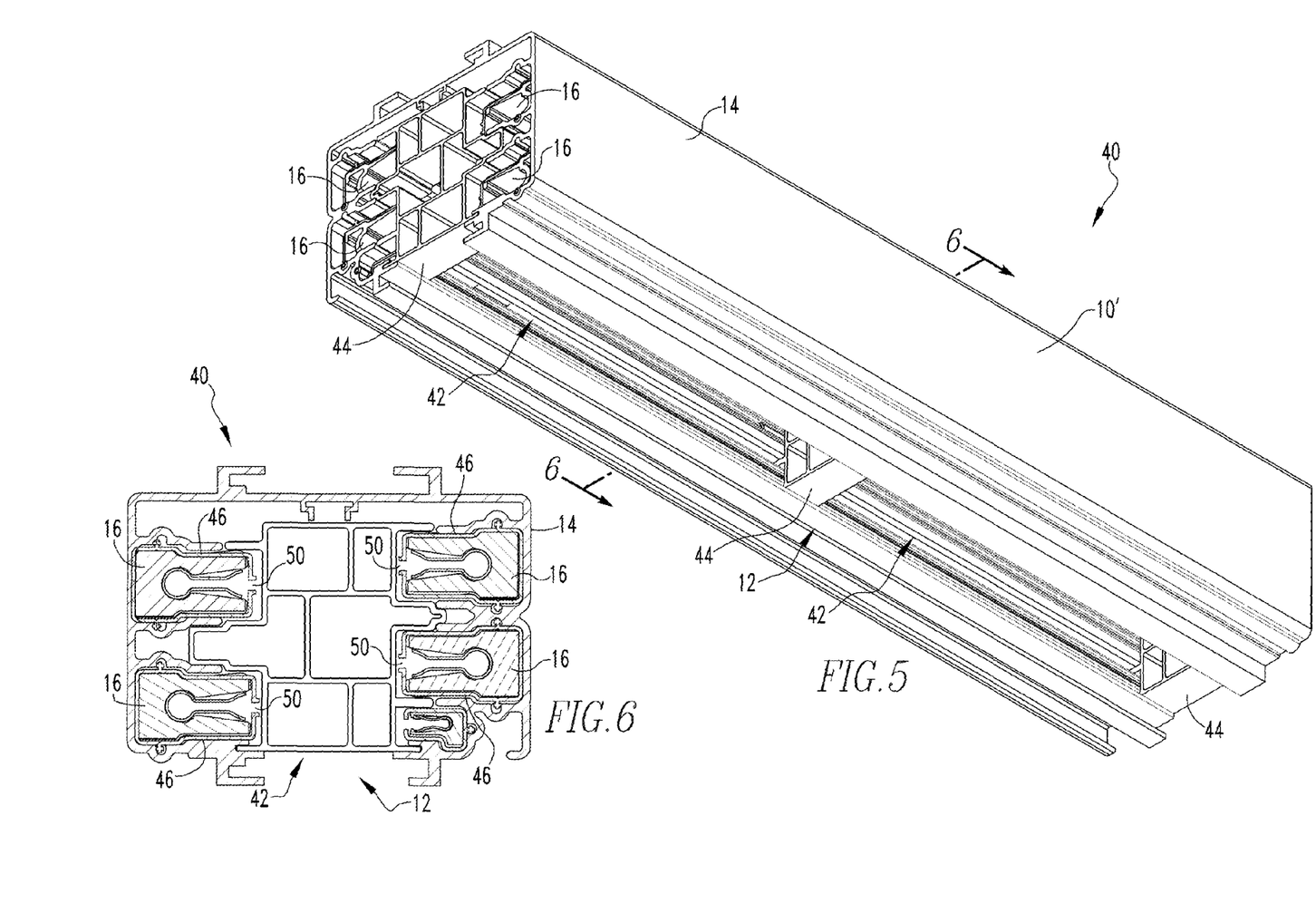
FIG. 5 is an isometric view of a section of another "non-continuous" busway assembly in accordance with another example embodiment of the present invention.
FIG. 6 is a sectional view of the busway assembly of FIG. 5 taken along line 6-6 of FIG. 5.

FIGS. 5 and 6 illustrate another example embodiment of a busway assembly 40 in accordance with the present invention in which the continuous opening 12 of busway 10' has been separated into a number of distinct "openings" 42 (two are shown in FIG. 5) of any reasonable and convenient length by a corresponding number of non-conductive divider members 44 (three are shown in FIG. 5) installed in the busway assembly 40 in a manner such that each member 44 spans across the previously continuous opening 12, similar to the arrangement discussed in regard to FIGS. 2-4. As shown in the sectional view of FIG. 6, unlike the arrangement previously discussed in regard to FIGS. 2-4, each divider member 44 generally abuts against portions of the housing 14 and/or individual busbar insulators 46 (discussed further below) and not against shield members. Preferably, each divider member 44 is inserted into each busway section at the time of manufacture, and is positioned at any reasonable and convenient distance from adjacent such dividers 44 so as to very minimally obstruct the previously continuous opening 12. Each divider member 44 is preferably secured in place (e.g., without limitation, via a mechanical fastener or adhesive) but depending on the application and securement mechanism employed may be repositioned as required.

Figures 7, 8:
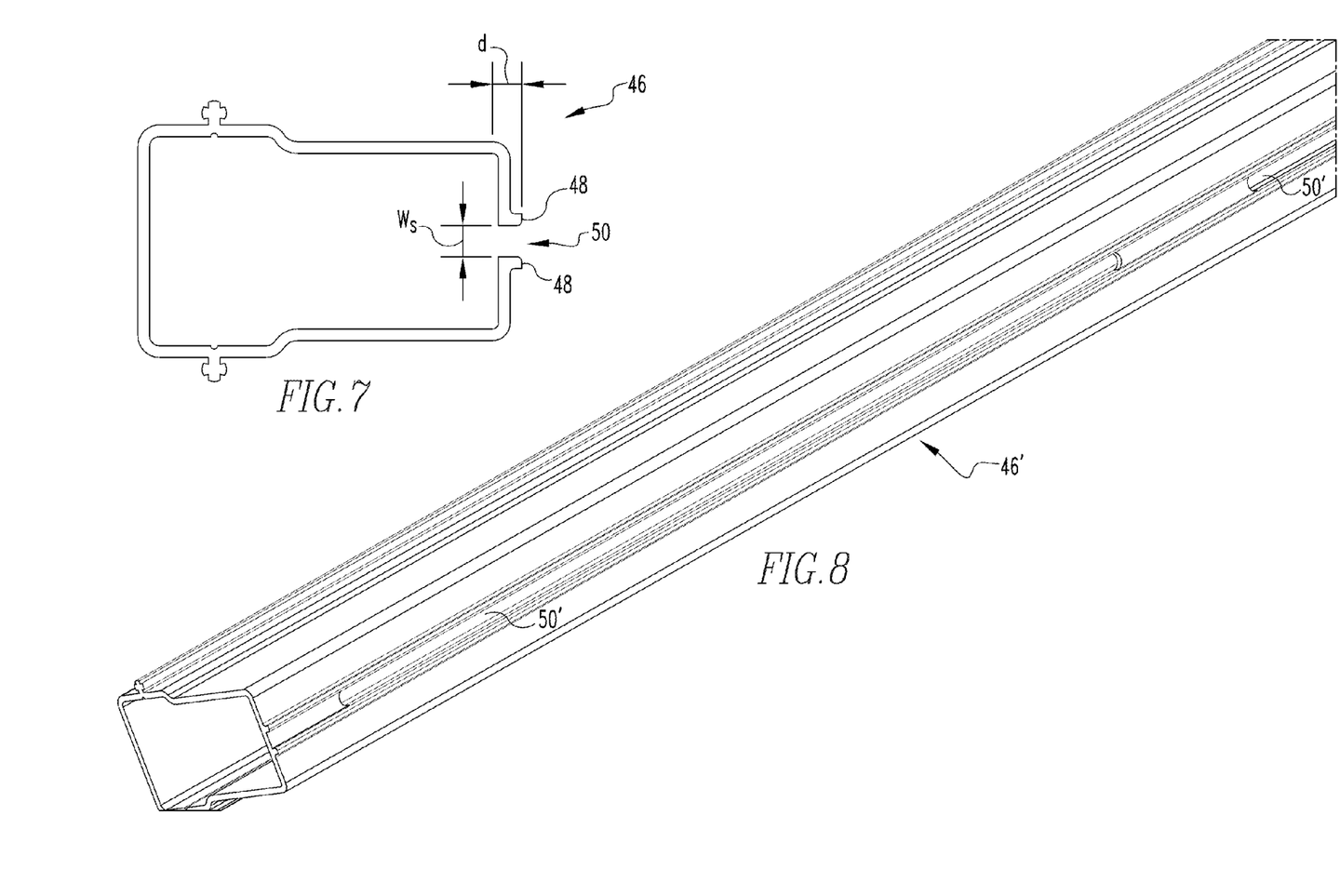
FIG. 7 is a sectional view a busbar insulator of the busway assembly of FIGS. 5 and 6.
FIG. 8 is an isometric view of an alternate embodiment of the busbar insulator of FIG. 7.

Referring to FIGS. 6 and 7, similar to busway assembly 18 shown in FIGS. 2 and 3, busway assembly 40 includes a section of busway 10' of similar construction as busway 10 shown in FIG. 1, except one or more of the internally mounted insulated busbars 16 is housed within an insulator 46 having extended portions 48 extending from the main body thereof about the continuous opening 50 formed therein.

Continuing to refer to FIGS. 6 and 7, insulator 46 completely surrounds the perimeter of busbar 16 aside from where the opening 50 is provided. The opening 50 is positioned and structured to allow a stab member of a takeoff device to pass therethrough and engage the busbar. Opening 50 is designed with a slot opening width dimension $w_s$ no larger than as specified by the UL Standard (e.g, UL 857). It is also designed to provide a specific depth d that ensures that any exposed electrically conductive portions of the busbar 16 are recessed behind the opening 50 of the insulating material by the UL required distance. An alternate embodiment 46' of the insulator member 46 of FIG. 7 is illustrated in FIG. 8. Insulator member 46' is generally arranged in a similar manner to insulator member 46 however instead of having a single "continuous" opening 50, insulator member 46' includes a number (two are shown in FIG. 8) of non-continuous, "discrete" openings 50' formed therein.

Figure 9:
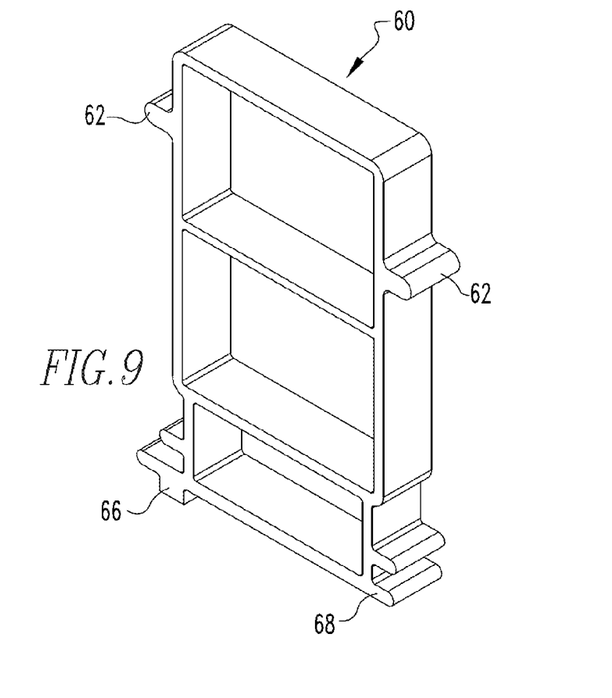
FIG. 9 is an isometric view of a divider member in accordance with yet another example embodiment of the present invention.
Figure 10:
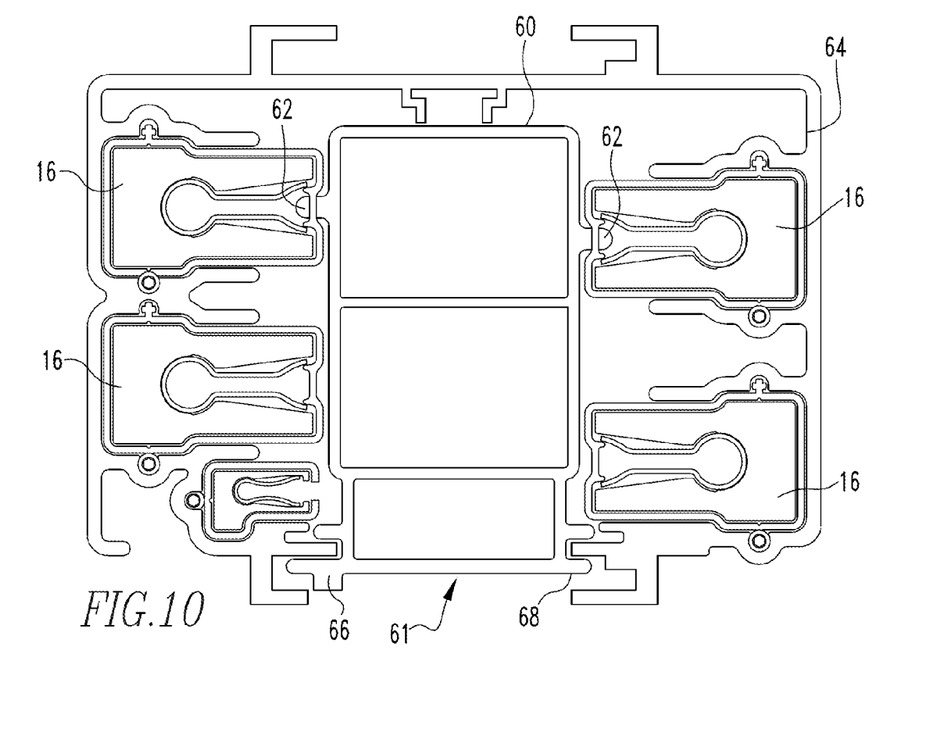
FIG. 10 is a sectional view of another busway assembly in accordance with another example embodiment of the present invention including the divider member of FIG. 9.

FIGS. 9 and 10 illustrate another example embodiment of a divider member 60 similar to the divider member 44 discussed in conjunction with FIGS. 5 and 6 for separating a "continuous" opening in a busway into a number of "discrete" openings 61 (one is shown in the sectional view of FIG. 10). Divider member 60 includes a number of tabs 62 (two are shown in the example illustrated in FIGS. 9 and 10) which are adapted to engage openings (not numbered) in busbars and/or busbar insulators to assist in positioning and securing divider member 60 within a busway 64. Divider member 60 may further include a number of lower tabs 66, 68 structured to engage a portion (not numbered) of the busway housing at or about the opening 61. Such tabs are generally provided to assist in positioning and securing divider member 60 within busway 64 and as such may optionally be provided with a securement mechanism (e.g., without limitation, a setscrew or other suitable fastener) to secure divider member 60 to busway 64.

It is to be appreciated that the busbars illustrated herein are provided for exemplary purposes only and are not intended to be limiting upon the scope of the present invention. Accordingly, the inclusion of differing busbar designs in some of the FIGS. has been provided to demonstrate some of the interchangeability of elements of the present invention without intending to limit the present invention to such particular arrangements.

From the foregoing it is to be appreciated that embodiments of the present invention improves the flexibility in locating a takeoff device. The unobtrusive designs are easy to use and produce a pleasing appearance while providing busway assemblies that meet applicable safety standards. In general, embodiments of the present invention obstruct at most 20% of the previously continuous access slot of the busway and preferably obstruct only about 10%, and in some embodiments even less.

While specific embodiments of the present invention have been described in detail, it will be appreciated by those skilled in the art that various modifications and alternatives to those details could be developed in light of the overall teachings of the disclosure. For example, without limitation, the example divider member shown in the embodiments of FIGS. 5-6, shown used in conjunction with busbars having a continuous access slot may be employed with busbars having discontinuous, discrete access points (such as shown in the embodiment of FIG. 10. Similarly, the divider embodiment illustrated in FIGS. 9 and 10 could be used with a busbar having a continuous access slot. Accordingly, the particular arrangements disclosed herein are meant to be illustrative only and not limiting as to scope of the present invention which is to be given the full breadth of the claims appended and any and all equivalents thereof.

What is claimed is:

1. An electrical busway assembly comprising:
   a housing;
   a number of busbars disposed in the housing, each busbar having a continuous opening running along generally the entire length of the busbar which is adapted to receive a respective stab member of a plurality of plug-in units generally at any point along the entire length thereof; and
   a plurality of members, each formed from a non-conductive material and disposed across the continuous opening of each busbar such that the continuous opening of each busbar is divided into a plurality of discrete openings.

2. The busway assembly of claim 1 wherein at most 20% of the area of the continuous opening of each busbar is covered by one or more of the plurality of members.

3. The busway assembly of claim 2 wherein at most 10% of the area of the continuous opening of each busbar is covered by one or more of the plurality of members.

4. An electrical busway comprising:
   a housing;
   at least two busbars disposed within the housing, each busbar having a continuous opening generally running along the entire length of each busbar which is adapted to receive a stab member of a plurality of plug-in units generally at any point along the entire length thereof; and
   a non-conductive shield member disposed such that the shield member generally abuts the continuous opening of each of the busbars, the shield member comprising a plurality of discrete slots formed therein and disposed linearly along the shield member, each slot positioned and structured to allow access to a portion of the continuous opening of only one of the busbars while portions of the shield member prevent access to other portions of the continuous opening of each of the busbars.

5. A method for converting a section of electrical busway having a plurality of busbars with continuous openings provided therein into an electrical busway having a number of busbars with discrete access points formed in the continuous openings, the method comprising:
   disposing a plurality of non-conductive separating members across the continuous opening of each busbar of the plurality of busbars such that each continuous opening is divided into a plurality of discrete openings bounded by adjacent separating members.

6. The method of claim 5 wherein the plurality of separating members are disposed such that only a minimal amount of the continuous opening of each busbar is blocked.

7. The method of claim 5 wherein the separating members are disposed in the electrical busway during initial assembly of the busway.

8. The method of claim 5 wherein the separating members are disposed in the electrical busway as a retro-fit operation after the busway has been assembled.

9. The method of claim 5 further comprising securing each of the non-conductive separating members to a portion of the electrical busway.

10. A busbar assembly comprising:
    a busbar having a continuous opening running along the length thereof which is adapted to receive a respective stab member of a plurality of plug-in units generally at any point along the entire length thereof; and
    a plurality of non-conductive separating members disposed across the continuous opening such that the continuous opening is divided into a plurality of discrete openings bounded by adjacent separating members.

11. The busbar assembly of claim 6 wherein the total area of the discrete openings is at least 80% of the area of the continuous opening.

12. The busbar assembly of claim 7 wherein the total area of the discrete openings is at least 90% of the area of the continuous opening.

* * * * *